Figure 1:
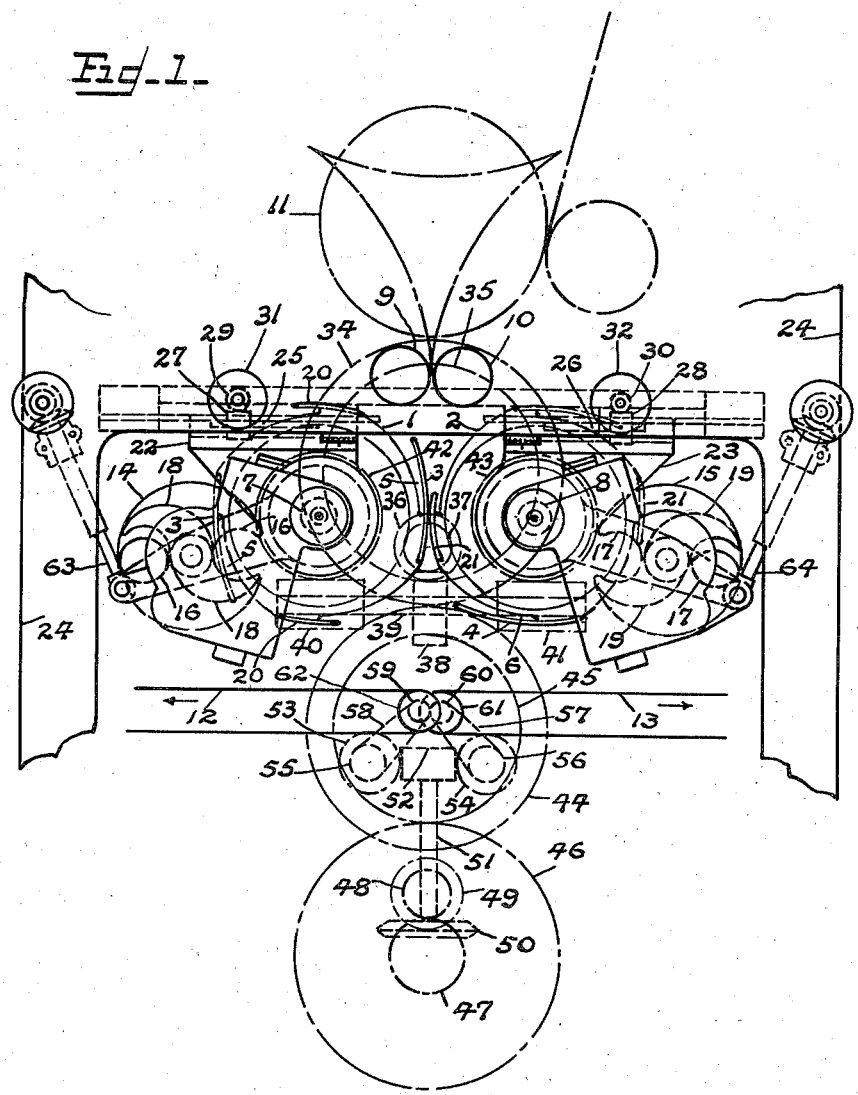

June 21, 1938.   C. G. QUICK ET AL   2,121,327
DELIVERY MECHANISM FOR USE WITH PRINTING MACHINES
Filed Jan. 3, 1935   2 Sheets-Sheet 2

INVENTORS.
Cecil G. Quick
Donald A. Ball
William A. Whitehead
By Albert J. Horton
ATTY Patented June 21, 1938

2,121,327

UNITED STATES PATENT OFFICE 2,121,327

DELIVERY MECHANISM FOR USE WITH PRINTING MACHINES

Cecil George Quick, Donald Arthur Ball, and William Arnold Whitehead, London, England, assignors to R. Hoe & Co., Inc., New York, N. Y., a corporation of New York Application January 3, 1935, Serial No. 222
In Great Britain January 6, 1934

15 Claims. (Cl. 93—93)

This invention relates to delivery mechanism for use with printing machines and is more particularly concerned with what are termed "delivery flies" comprising arms or blades fixed to rotatable hub members and providing therewith pockets for receiving products from the printing machine.

The main object of the present invention is to provide a simple mechanism whereby a succession or stream of products to be divided into two groups or paths so as to enable the products of a high speed printing machine to be easily handled by the operator.

According to the present invention there are provided two flies rotated in opposite directions and disposed about the zone to which the succession or stream of products is fed and the pockets of the two flies are set in an out of phase relationship such that, in conjunction with the disposition of the flies, a pocket of one fly is presented to take a product and then a pocket of the other fly is presented to take the next product whereafter a pocket of the first fly is presented to take the succeeding product and so on, the flies operating to take alternate products.

In one arrangement the two flies are similar and each has two pockets which are formed conjointly by a plurality of hub members each having two blades secured thereto and spaced 180° apart around the hub member, each hub member and each of its two blades providing a part of each pocket, the two pockets of each fly thus being formed by a plurality of spaced pocket elements formed by each hub member and its blades. The flies are arranged with their axes of rotation on opposite sides of the path followed by the products as they pass in succession from the printing machine and moreover the axes are so positioned that the pockets of the two flies are brought across the line followed by the products, the blades of one fly intercalating those of the other fly.

The two flies are rotated in opposite directions and the blades of one fly are set so as to be approximately 90° out of phase (i. e. 90° lead or lag) with respect to those of the other fly. Thus it will be seen that during each complete revolution of the flies, four pockets are presented in succession to the products issuing from the printing machine, and thus four successive products are taken by the flies. The products will be taken by the two flies in alternation, one fly taking one product, the other fly taking the next product and so on.

The products taken by the flies are arranged to be deposited respectively on conveyor belts or chains which convey the products taken by the respective flies to opposite sides of the machine.

The invention thus provides a simple apparatus enabling a succession of products issuing from a single point in a printing machine to be divided into two paths each having products delivered at one half the rate at which they issue from the printing machine: the invention thus enabling the products of a high speed printing machine to be handled with ease by the operators.

If desired there may be located below and centrally between the two flies a roller or an inverted V-shaped member which operates to steady the tails of the products as they are carried round by the flies.

Any desired mechanism may, if desired, be provided for enabling the products to be counted: for example any usual kicker mechanism may be provided to eject a "count" product from the flies and on to the conveyors a greater distance than the products between successive count products or the mechanism described and claimed in the specification of our pending application Ser. No. 739,750 filed August 14, 1934, may be provided.

It will be understood that the term "printing machine" is intended to include any mechanism normally associated therewith, e. g. a folding mechanism in which case the products of the printing machine would be delivered to the flies from the folder usually through the intermediary of rollers including or consisting of the usual folding-off rollers.

Figure 2:
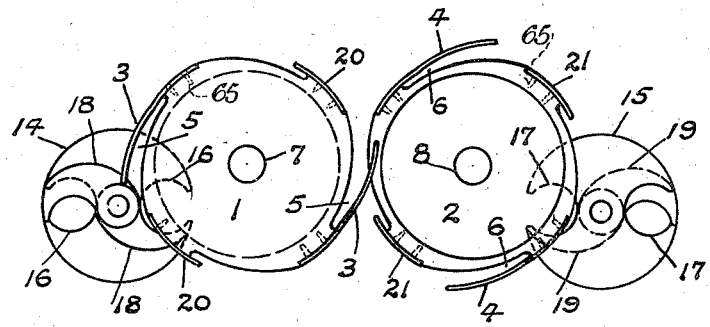
Figure 3:
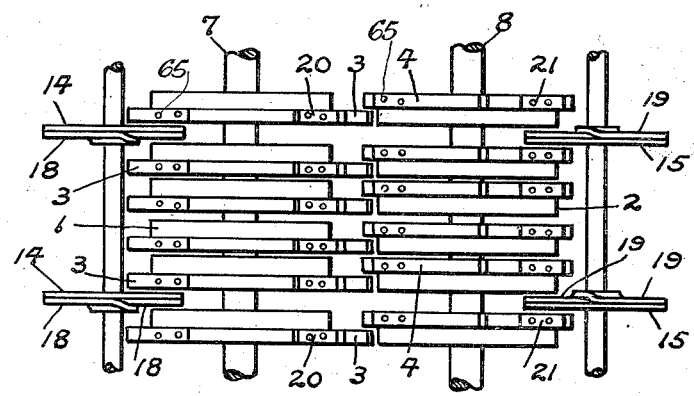

The invention is illustrated in the accompanying drawings in which Figure 1 is an end elevation showing certain parts associated with the invention in dotted lines, Figure 2 a detail view showing the mechanism constructed in accordance with the invention, and Figure 3 a detail plan view of the mechanism shown in Figure 2.

Referring to the drawings there are provided two flies each having two pockets formed conjointly by hub members 1, 2 and blades 3, 3 and 4, 4 respectively secured 180° apart thereto, so providing pockets 5, 5 and 6, 6 in the two flies. The construction shown includes peripherally spaced apart blade end supporting surface portions and adjacent surface portions upon the periphery of the hub members 1 and 2, over which latter surfaces the blades 3 and 4 extend to form the pockets 5 and 6. The hubs are secured to shafts 7, 8 driven (in the manner hereinafter described) in opposite directions: the flies are so arranged that the path followed by the blades 3 intersects the path followed by the blades 4, the blades 3, 3 intercalating the blades 4, 4 and the products to be delivered by the flies are fed to a point midway between the flies, the feed being effected in the case shown by folding off rollers 9, 10 which operate to fold products delivered from a folding and cutting cylinder 11. This folding and cutting mechanism is well known to those skilled in the art and further description is therefore believed to be unnecessary. The blades 3 on the hubs 1 are out of phase with the blades 4 on the hubs 2 so that a pocket 5 on one fly is first caused to move into position to receive a product and then a pocket 6 on the other fly is moved into position to receive the next product and so on, successive products being taken alternately by the two flies.

It will be seen that for each rotation of the two flies, four pockets will be presented to four successive products, these four products being taken by the two flies in alternation. Associated with each fly is a continuously driven belt or chain conveyor, the conveyors being indicated respectively at 12, 13 and extending respectively to opposite sides of the machine and being driven in opposite directions. Also associated with each fly are discs indicated respectively at 14, 15, the discs being positioned so as to extend between the blades of their corresponding flies: thus, as the flies rotate with a product in one of their pockets, the edge of the product is moved into engagement with the corresponding discs and is caused thereby (as the fly continues its rotation) to move out of the pocket and to drop on to the corresponding conveyor which then carries the product towards the side of the machine, the successive products on the conveyors being spread out on the conveyor in the usual manner due to the continued movement of the conveyors during the interval between the delivery of successive products to the conveyor.

In order to enable the products to be counted, the mechanism shown in the drawings includes mechanism constructed in accordance with the invention described and claimed in the specification of the application Ser. No. 739,750. This mechanism includes means for rotating the discs 14, 15 which are provided with pockets or recesses 16, 17 which, during the rotation of the discs are presented to certain products as they are carried by the flies and allow these products to travel further with the flies before they are ejected, these products thus lying over the products previously delivered to the corresponding conveyor. The discs 14, 15 are also provided with hook shaped pieces 18, 19 which, in the manner described in the specification of application Ser. No. 739,750 can be regulated to close one pocket entirely, leaving the other open, and with the fly apparatus set to deliver copies alternately one of the pockets in each of the discs 14, 15 would so be closed, so that only one pocket would be presented for each complete rotation of the discs 14, 15. The rate of rotation of the discs 14, 15 is such that the pockets are presented when the required number of products to form a batch or "count" has been delivered so that the products received by the pockets constitute count copies indicating the batch by their position on the conveyors.

In the arrangement shown the hubs of the flies are formed with four pockets or recesses and with the parts set to deliver products alternately as has been described (in which case only two arms 3, 3 and 4, 4 are fitted to the hubs to provide two pockets in each hub) the hubs have short arms 20, 21 respectively secured to them. The arms on the hubs of one fly operate in conjunction with the inner or fixed ends of the blades 3 or 4 of the other fly to steady the trailing ends of products carried in the pockets of the first fly. If, however, it is desired to deliver all the products to only one side of the machine, then the arms 20 (or 21) of the fly to be employed are removed from that fly and are substituted by the blades 4 (or 3) taken from the other fly, the arms 20 (or 21) removed from the first fly being secured to the other fly in substitution for the removed blades 4 (or 3) of that fly. To facilitate the removal and substitution of the arms 20 and 21 and the blades 3 and 4 as above described these parts may be detachably secured to the respective hubs by suitable means such as screws 65. Thus, when this change over has been effected the products which are fed successively from the folding-off rollers 9, 10 will be taken by one fly only, and these products will be delivered to only one conveyor the arms 20, 21 on the other fly operating to steady the products taken by the other fly. Obviously the delivery can be effected to either side of the machine. As the products are taken by one fly at twice the rate at which they are taken when both flies are operative, it is necessary to adjust the mechanism for effecting the counting of the copies and for this purpose the piece 18 (or 19) of the discs 14 (or 15) which was operated to close a pocket 16 (or 17) is now moved to open the pocket so that a pocket is now presented to a product for each half revolution of the discs, this giving the same number of products to the counted batch as when delivering copies alternately.

To enable the distance between the two flies and the position of the flies with respect to the path followed by a product as it issues from the folding-off rollers 9, 10 to be adjusted, the shafts 7, 8 of the flies are mounted to rotate in brackets 22, 23 which are slidably suspended from a main frame member 24 and the brackets are provided respectively with rods 25, 26 which are screw threaded to engage nuts 27, 28 prevented from axial movement and rotated, through skew or worm and worm wheel gearing 29, 30 by handwheels 31, 32. By rotating the handwheels 31, 32 the separation between the flies and the position of the two flies can be regulated.

Drive to the flies, the conveyors and also to the counting mechanism is effected in the following manner. There is provided a main drive gear wheel 34 fast with an internally toothed wheel 35 in mesh with a pinion 36 fast with a worm 37 in mesh with a worm wheel 38 fast on a shaft 39. This shaft 39 has right and left hand worms 40, 41 meshing with worm wheels 42, 43 fast with the shafts 7, 8 of the flies so that these two flies are rotated in opposite directions. The count mechanism is, in the manner described in the specification of application Ser. No. 739,750 driven from the fly shafts 7, 8. The gear wheel 34 is in mesh with a gear wheel 44 fast with a gear wheel 45 in mesh with a gear wheel 46 fast with a gear wheel 47 in mesh with a pinion 48. This pinion 48 is fast with a bevel gear wheel 49 in mesh with a bevel gear wheel 50 fast on a shaft 51 having a skew or worm 52 in mesh on opposite sides of its diameter with skew or worm wheels 53, 54 fast respectively with chain wheels 55, 56 around which pass chains 57, 58 passing around chain wheels 59, 60 fast with chain wheels or pulleys 61, 62 around which the conveyors pass.

In Figure 1 are shown two rods 63, 64 by means of which the position of the discs 14, 15 can be regulated, in the manner described in the specification of application Ser. No. 739,750 with respect to the flies.

What we claim is:—

1. In delivery mechanism for use with means for feeding a succession or stream of products passing from a printing machine, the combination of two flies each comprising a hub member and a blade, means rotatably positioning the flies about the feeding zone, means rotating the flies in opposite directions, the positioning of the flies being such that the blade of one fly follows a path intersecting about the feeding zone the path followed by the other fly, and the two flies being set in such an out of phase relationship that the flies operate to take alternate products, and an arm secured to each hub member of one fly and co-operating with the blade secured to the other hub member of the other fly to steady a product carried by the first fly.

2. In delivery mechanism for use with means for feeding a succession or stream of products passing from a printing machine, the combination of two flies each comprising a hub member and a plurality of blades secured in equally spaced relationship to the hub member, means rotatably positioning the flies about the feeding zone, means rotating the flies in opposite directions, the positioning being such that the blades of one fly follow a path which intersects about the feeding zone the path followed by the blades of the other fly, and the two flies being set in such an out of phase relationship that the flies operate to take alternate products, and arms secured to the hub of each fly, the arms of one fly co-operating with the blades of the other fly to steady products taken by the first fly.

3. In delivery mechanism for use with means for feeding a succession or stream of products passing from a printing machine, the combination of two flies each comprising a hub member and a blade, said hub member and blade cooperating to form a pocket to loosely receive a product, means rotatably positioning the flies about the feeding zone, means rotating the flies in opposite directions, the positioning of the flies being such that the blade of one fly follows a path intersecting about the feeding zone the path followed by the other fly, and the two flies being set in such an out of phase relationship that the flies operate to take alternate products, and means to transversely adjust the two flies in relation to one another and to the feeding zone.

4. In delivery mechanism for use with means for feeding a succession or stream of products passing from a printing machine, the combination of two flies each having a plurality of pockets, each pocket formed by a blade and being adapted to loosely receive a product disposed about the zone to which the succession of products is fed and set with their pockets in an out of phase relationship, means for rotating the flies in opposite directions, the dispositions of the flies and the phase relationship of the pockets being such that in the rotation of the flies a pocket of one fly is first presented to take a product whereafter a pocket of the other fly is presented to take the next product, and a pocket of the first fly is next presented to take the succeeding product and so on, the flies operating to take alternate products, an endless conveyor mechanism for each fly, means to move said conveyor mechanisms in opposite directions, and means causing the products taken by the flies to pass on to the respective conveyor mechanism.

5. In delivery mechanism for use with means for feeding a succession or stream of products passing from a printing machine, the combination of two flies each having a plurality of pockets, each pocket formed by a blade and being adapted to loosely receive a product, each comprising a hub member and a blade, means rotatably positioning the flies about the feeding zone, means rotating the flies in opposite directions, the positioning of the flies being such that the blade of one fly follows a path intersecting about the feeding zone the path followed by the other fly, and the two flies being set in such an out of phase relationship that the flies operate to take alternate products, an endless conveyor mechanism for each fly, means to move said conveyor mechanisms in opposite directions, and means causing the products taken by the flies to pass on to the respective conveyor mechanism.

6. In delivery mechanism for use with means for feeding a succession or stream of products passing from a printing machine, the combination of two flies each comprising a hub member and a plurality of blades secured in equally spaced relationship to the hub member to form pockets, each pocket being adapted to loosely receive a product therein, means rotatably positioning the flies about the feeding zone, means rotating the flies in opposite directions, the positioning being such that the blades of one fly follow a path which intersects about the feeding zone the path followed by the blades of the other fly, and the two flies being set in such an out of phase relationship that the flies operate to take alternate products, an endless conveyor mechanism for each fly, means to move said conveyor mechanisms in opposite directions, and a rotatable disc causing the products taken by the flies to pass on to the respective conveyor mechanism.

7. In delivery mechanism for use with means for feeding a succession or stream of products passing from a printing machine, the combination of two flies each comprising a hub member and a blade, means rotatably positioning the flies about the feeding zone, means rotating the flies in opposite directions, the positioning of the flies being such that the blade of one fly follows a path intersecting about the feeding zone the path followed by the other fly, and the two flies being set in such an out of phase relationship that the flies operate to take alternate products, an endless conveyor device for each fly, means causing the conveyor devices to move continuously, the devices on their operative run moving in the same general direction as the delivery side of the associated fly, ejector devices operating to cause products to pass from the flies to the respective conveyor devices, and means operating the ejector devices so as to provide a normal position and a second position which allows one product to travel further with the fly than preceding and succeeding products, whereby this product is displaced from the other products on the respective conveyor device.

8. Mechanism as claimed in claim 7, and in which the ejector devices comprise rotatable discs extending across the path followed by the blades of the flies, the peripheries of the discs providing abutment surfaces causing products to fall from the flies on to the respective conveyor device, and in which the discs are provided with pockets which are periodically presented to products to allow these products to travel further with the flies before being caused to fall from the flies.

9. In a delivery mechanism for a printing machine, a pair of cooperating rotating flies, each having pockets and being adapted to receive alternate products from the printing machine first in a pocket of one and then in a pocket of the other, and means rotating with one fly and cooperating with the other to steady a product in the pocket thereof.

10. In a delivery mechanism for a printing machine, a pair of cooperating rotating flies, each having pockets and being adapted to receive alternate products from the printing machine first in a pocket of one and then in a pocket of the other, and means associated with each of said flies to remove the product received by the pockets thereof, including means to displace one of the products of a plurality removed relatively to the others at regular intervals.

11. In a delivery mechanism for a printing machine, a pair of cooperating rotating flies, each having pockets and being adapted to receive alternate products from the printing machine first in a pocket of one and then in a pocket of the other, means to remove the product from each of said flies, and means to receive the removed product from each of said flies and carry it away therefrom, said last mentioned means moving in opposite directions.

12. In a delivery mechanism for a printing machine, a pair of cooperating rotatable flies, each including a hub member, means to rotate said flies in opposite directions, a plurality of blades, and means to locate and secure the blades to the hub member including the provision of raised blade end supporting surfaces arranged in equally spaced apart relationship about the periphery of the hub member and other surfaces between the raised ones and over which the blades extend in spaced relation thereto to form a pocket between each blade and each of the other surfaces on the hub member, the raised and other surfaces on each hub member being arranged to locate the blades thereon whereby all the blades may be secured equally spaced apart on one hub, the blades may be secured alternately disposed on both hubs, or more may be secured on one hub than is on the other, with the pockets so formed being adapted to receive products in succession and deliver them separated in accordance with the number of blades on the respective hubs.

13. In a delivery mechanism for a printing machine, a pair of cooperating rotatable flies, each including a hub member, means to rotate said flies in opposite directions, a plurality of blades, means to locate and secure the blades to the hub member in equally spaced apart relationship about the same and adapted to form a pocket between each blade and the hub member, the securing means on each hub member being arranged to locate the blades thereon whereby all the blades may be secured equally spaced apart on one hub, the blades may be secured alternately disposed on both hubs, or more may be secured on one hub than is on the other, with the pockets so formed being adapted to receive products in succession and deliver them separated in accordance with the number of blades on the respective hubs, and a plurality of arms attachable to the hub members in place of any of the blades on one hub member in opposition to the blades on the other hub member to steady products carried in the pockets formed by the blades and the hub member.

14. In a delivery mechanism for a printing machine, a pair of cooperating rotatable flies, each fly including a hub member having equally spaced apart blade locating and securing means upon its periphery, a plurality of blades, each adapted to be secured by any one of said means upon either of said hub members to form a product receiving pocket between the blade and the hub member, and a plurality of arms, each adapted to be secured by any one of said means upon one of the hub members in opposition with a blade upon the other hub member to steady a product in the pocket formed by said blade.

15. In a delivery mechanism for a printing machine, a product feeding means adapted to direct products from the machine, a pair of cooperating flies each having a pocket thereon and arranged to receive alternate products from said means, means to oppositely rotate said flies to present a pocket in alignment with the direction of movement of products from the product feeding means, bearing members for each of the flies, and means to slidably adjust the bearing members to move the flies relatively to each other and to the path taken by the products from the feeding means, whereby the pockets may be positively aligned with the direction of movement of the products.

CECIL GEORGE QUICK.
DONALD ARTHUR BALL.
WILLIAM ARNOLD WHITEHEAD.